June 28, 1932.  H. CHRISMAN  1,865,082
PRESSURE INDICATOR
Filed Jan. 25, 1924   2 Sheets-Sheet 2
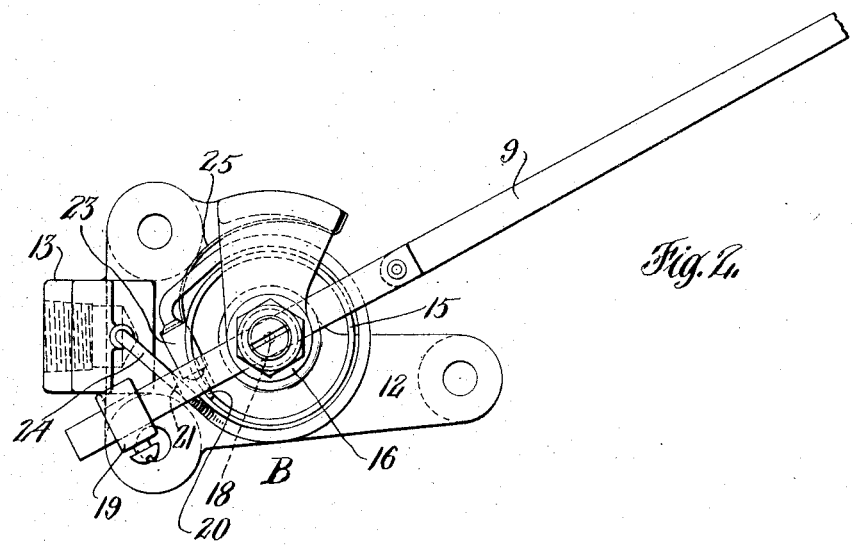
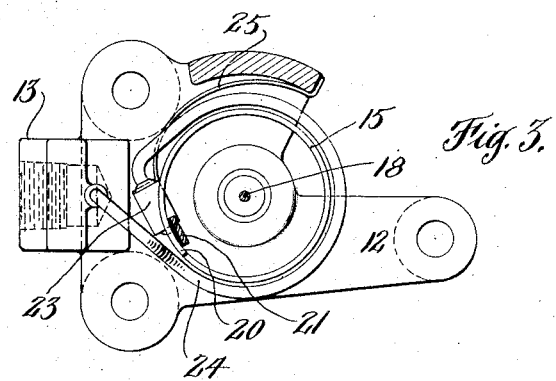
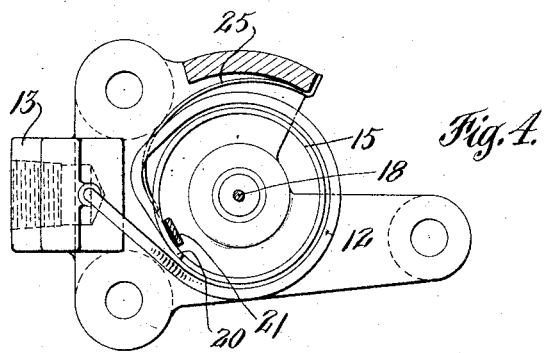
WITNESS
Gustav Genzlinger.
INVENTOR
Horace Chrisman
BY
ATTORNEYS Patented June 28, 1932

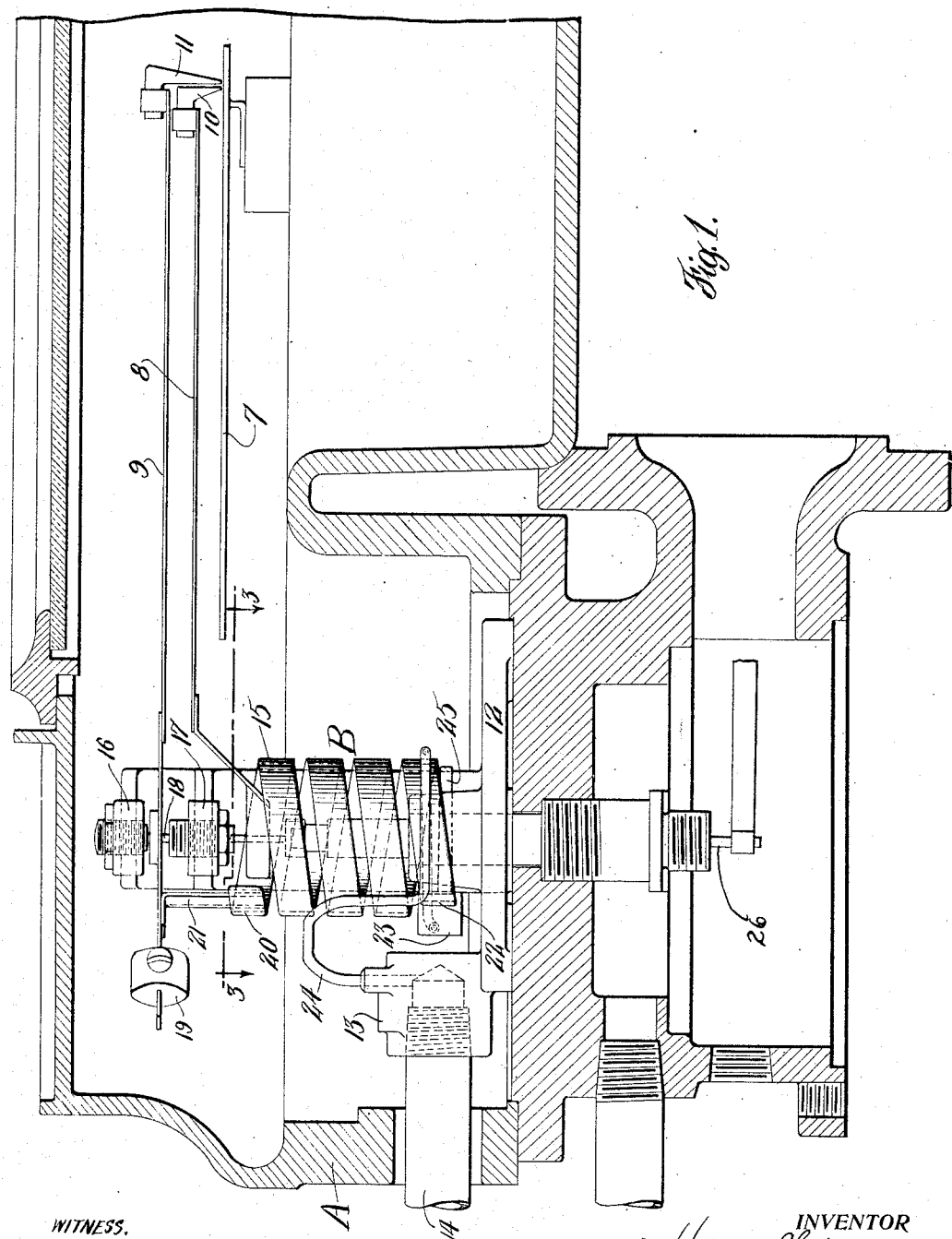

1,865,082

UNITED STATES PATENT OFFICE

HORACE CHRISMAN, OF EDGEWOOD, PENNSYLVANIA, ASSIGNOR, BY MESNE ASSIGNMENTS, TO PITTSBURGH EQUITABLE METER COMPANY, OF PITTSBURGH, PENNSYLVANIA, A CORPORATION OF PENNSYLVANIA

PRESSURE INDICATOR

Application filed January 25, 1924. Serial No. 688,387.

This invention relates to pressure recording and indicating devices and while it is shown in connection with a gas measuring unit it is equally adaptable for other purposes.

The invention has to do with pressure or other recording and indicating devices employing what is commonly known in this art as a pressure tube, such being usually helical or in some other form by virtue of which the pressure causes the tube to unwind or otherwise shift so that its circumferential movement may be utilized for the transmission of movement to a pen or other indicating arm. As an incident to the construction of the tube there is also radial movement thereof under varying pressure conditions.

One of the primary objects of my invention is to provide an improved arrangement whereby movement may be transmitted from the tube to the pen arm or indicating hand while at the same time the radial movement above described may take place without imposing appreciable stresses on the operating parts.

More specifically my invention contemplates an improved arrangement whereby the pressure tube operates the indicating means directly, yet without imposing appreciable stress on the parts, particularly the bearings.

In recording and indicating devices prior to my invention it has been customary to rigidly secure one end of the pressure tube to the base or support and to take care of the radial and circumferential changes of the tube at the other end through the medium of a special flexible driving connection attached to the pen arm shaft. By my arrangement I accomplish the desired results in a simpler and more effective way and transmit movement to the pen arm directly from the pressure tube itself.

The above as well as other objects and advantages as may hereinafter appear, I attain by means of a construction which I have illustrated in preferred form in the accompanying drawings wherein:

Figure 1 is a section through an instrument embodying my invention and showing the indicating dial in a horizontal position although ordinarily for convenience in reading, the instrument, as a whole, is mounted in a vertical position.

Figure 2 is a plan view of the pressure recording device.

Figure 3 is a section on line 3—3 of Figure 1 and

Figure 4 is a section similar to Fig. 3 but showing a slightly modified form.

Referring now to the drawings I have shown my invention applied to a gas measuring unit comprising the gauge casing indicated by the reference letter A, in which are mounted the dial 7, pen arm 8, and pen arm 9, which are provided with pens 10 and 11, preferably of the fountain type. The dial 7 is revolved by a standard form of clock mechanism. The pen arm 8 (not per se a part of the present invention) actuated through shaft 26 from a differential pressure gauge of any suitable type is for recording the differential pressure between the upstream and downstream side of an orifice plate (not shown) which is located in the pipe line to aid in determining the rate of flow.

The pressure recording device, indicated as a whole by the reference letter B, is also shown mounted within the casing A and comprises the base or support 12, provided with a header lug 13, having a threaded opening for attachment of the pipe 14, connected with the source of pressure. Positioned substantially in line with the axis of the flattened helical pressure tube 15 and above such tube are the bearings 16 and 17 for the pen arm shaft 18. The shaft 18 may be mounted in adjustable jewels whereby friction and wear are minimized, which is important in a device of this class in order to render the indication more accurate. As a still further safeguard in this direction the pen arm is provided with an adjustable weight 19 whereby balance of the pen parts may be established.

The helical pressure tube 15, which operates the pen arm 9, has its upper end 20 rigidly secured to the bracket 21 of the pen arm, and motion is transmitted to the pen arm by the unwinding of the tube produced by the pressure within the tube. This unwinding produces circumferential movement of the end 20 and hence movement of the pen arm. Such being the case it will be apparent that the other end 22 of the tube must be supported in such a manner that the unwinding movement takes place from such end toward the other end. Since however the end 20 is rigidly secured to the arm 9 for driving purposes, it will be apparent that the radial expansion of the helix which is an incident to the unwinding, must take place from the end 20 toward the end 22 if stress on the parts is to be avoided. Hence the end 22 must be free to shift or move radially.

I meet these conditions in the following manner. Gas from the pipe 14 enters the header lug 13 and is conducted therefrom to the tube by means of the lead 24 discharging into the hollow block 23 secured to the end 22 of the pressure tube. This lead which is thin and of relativey soft material has an inverted U bend and passes annularly around the tube providing a second loop. By virtue of the two loops the lead has sufficient flexibility to permit the end 22 of the pressure tube to freely expand i. e., move or shift radially. To restrain the end 22 of the tube from shifting circumferentially under the pressure within the tube, I provide the arcuate flexible strip 25 one end of which is secured to the end 22 and the other end to the base in such a way as to fix the end 22 against circumferential movement while at the same time permitting radial expansion movement of the tube.

By this floating arrangement of the tube the desired transmission of movement to the arm is brought about directly through the tube itself while at the same time the bearings are relieved of pressure by the freedom of the tube to expand radially, and it will be understood that the invention is not limited to the precise form of pressure tube shown.

In Fig. 4 I have shown a slightly modified form in which the pressure tube 15 is of flattened cross section to the point of attachment to the flexible member 25 and of circular cross section from this point to the place of attachment to the header lug 13. This last mentioned portion of the tube corresponds to the lead pipe 24 of my preferred form.

It will be understood that my invention is applicable to devices in which the pressure responsive element need not necessarily be in the form of a helix, a flat spiral or other curved forms of tube being adaptable to it also, and that the terms recorder and indicator are used in a broad sense.

I claim:

1. A pressure indicator including a frame, a shaft, an indicating arm on said shaft, a helical pressure tube one end of which is rigidly connected to the indicating arm, and a member secured to the frame and to the other end of the tube, said member being radially resilient but preventing circumferential movement of the end of the tube to which it is secured.

2. In a pressure indicator, a curved pressure responsive element, a pivotally mounted indicating element, means rigidly securing said curved pressure element to said indicating element, and a radially flexible but circumferentially rigid connection secured to said pressure element at a point spaced from the means connecting said pressure element and said indicating element.

3. In a pressure responsive device, a curved pressure tube, means attached to one end of said tube and movable by circumferential movement of said tube, means restraining radial movement of this end of the tube, and a radially flexible but circumferentially rigid connection secured to the other end of said tube.

4. In a pressure indicator, a frame, a shaft, an indicating arm on said shaft, a helical pressure tube, one end of which is connected to said indicating arm and a member secured to said frame and to the other end of said tube, said member being U-shaped in two different planes.

5. In a pressure indicator, a frame, a shaft, an indicating arm on said shaft, a helical pressure tube, one end of which is connected to said indicating arm and a member secured to said frame and to the other end of said tube, said member being curved in two planes at right angles to each other.

6. In a pressure indicator, a helical pressure responsive device, laterally flexible means connected to and surrounding one end of said device to maintain the portion of said helix including said end from circumferential movement, a flexible connection adapted to connect said device with a source of fluid pressure, said connection being flexible in a plurality of directions so that radial movement of said end of said device is permitted, a pivoted indicating arm, and means rigidly connected adjacent the other end of said device for attaching said arm to said device.

7. In an indicating instrument, an elongated coiled pressure tube, supporting means for said tube, means to permit circumferential movement only at one end thereof, an indicating device operable by circumferential movement of the tube under pressure influences, and flexible restraining means at the other end of the tube to permit only radial movement thereof at that end.

8. In a pressure indicator, an indicating mechanism, a connection adapted to be attached to a source of pressure, a curved pressure responsive element, a flexible pipe between said connection and one end of said pressure responsive element, a radially flexible but circumferentially rigid connection secured to said end of the pressure responsive element, and means directly connecting the indicating mechanism and the other end of said pressure responsive element, said means being adapted to restrain this end of the pressure responsive element from radial movement.

9. A pressure indicator including an indicating arm, a connection adapted to be attached to a source of pressure, and a coiled pressure tube in communication with said connection, means connecting one portion of said tube to said arm allowing circumferential movement only of the tube of that portion, and means flexibly supporting another portion of said tube for radial movement only.

10. The invention as defined in claim 9 wherein said indicator arm is carried by a shaft, and jewel bearings supporting said shaft.

11. A pressure indicator including an indicator arm, a connection adapted to be attached to a source of pressure, and a coiled pressure tube in communication with said connection, means connecting one end of said tube to said arm allowing circumferential movement only of that end of the tube, and means flexibly supporting the other end of said tube to permit radial movement, but to substantially restrain circumferential movement thereof.

12. A pressure indicator including an indicator arm, a helical pressure tube operatively connected to said arm at one end and flexibly supported for radial movement at one portion thereof, said operative connection being adapted to restrain said tube from radial movement but transmitting circumferential movement from said tube to said arm, and a flexible lead connected to the other end of said tube and adapted to communicate with a source of pressure.

In testimony whereof, I have hereunto signed my name.

HORACE CHRISMAN.